United States Patent [19]
Ziemba

[11] Patent Number: 4,705,143
[45] Date of Patent: Nov. 10, 1987

[54] DEER HUNTER'S TREE SEAT

[76] Inventor: Anthony Ziemba, 2110 Providence Ct., Eau Claire, Wis. 54703

[21] Appl. No.: 45,436

[22] Filed: May 4, 1987

[51] Int. Cl.[4] ............................................. A01M 31/02
[52] U.S. Cl. ..................................... 182/187; 108/152
[58] Field of Search ................ 182/187, 188; 108/152; 297/118, 255; 224/155

[56] References Cited
U.S. PATENT DOCUMENTS

| | | | |
|---|---|---|---|
| 2,847,059 | 8/1958 | Klins | 182/187 |
| 2,851,085 | 9/1958 | Woodward | 182/187 |
| 3,927,733 | 12/1975 | Wurn | 182/187 |
| 4,315,655 | 2/1982 | Machnik | 182/187 |
| 4,394,045 | 7/1983 | Shaw | 297/118 |
| 4,397,500 | 8/1983 | Moffitt | 182/187 |
| 4,553,635 | 11/1985 | Johnson | 182/187 |

Primary Examiner—Reinaldo P. Machado

[57] ABSTRACT

A portable lightweight seat that is attached to a tree to be used primarily by deer hunters comprising a tubular horizontal member 10 with supporting legs 14 and 16 attached to each end. A sturdy lightweight fabric 22 having one end attached to horizontal member 10. A flexible cord 24 sewn into hem of semi-circular end of fabric for fastening seat to tree. Cord 24 is also used to provide sling for carrying seat on hunters back.

1 Claim, 3 Drawing Figures

DEER HUNTER'S TREE SEAT

BACKGROUND

1. Field of Invention

This invention relates to a seat to be used by deer hunters to make the sport more enjoyable.

2. Description of Prior Art

Heretofore deer hunters have used stumps, logs and fallen trees as objects to sit on while waiting for deer to approach within a hunters shooting range. These lacked comfort, especially in snow covered areas where much of the deer are hunted. If some type of seat was carried, it lacked compactness, portability and the comfort of a back rest. That may be the reason very few deer hunters carry a seat with them, but usage would increase substantially with the proper design.

OBJECTS AND ADVANTAGES

Accordingly, we believe users of this seat will find it inexpensive, easy to carry, set up or take down, making it a welcome addition to a hunter's equipment.

Further advantages of the invention will become apparent from the ensuing description of the drawings.

DESCRIPTION OF DRAWINGS

Figure 1:
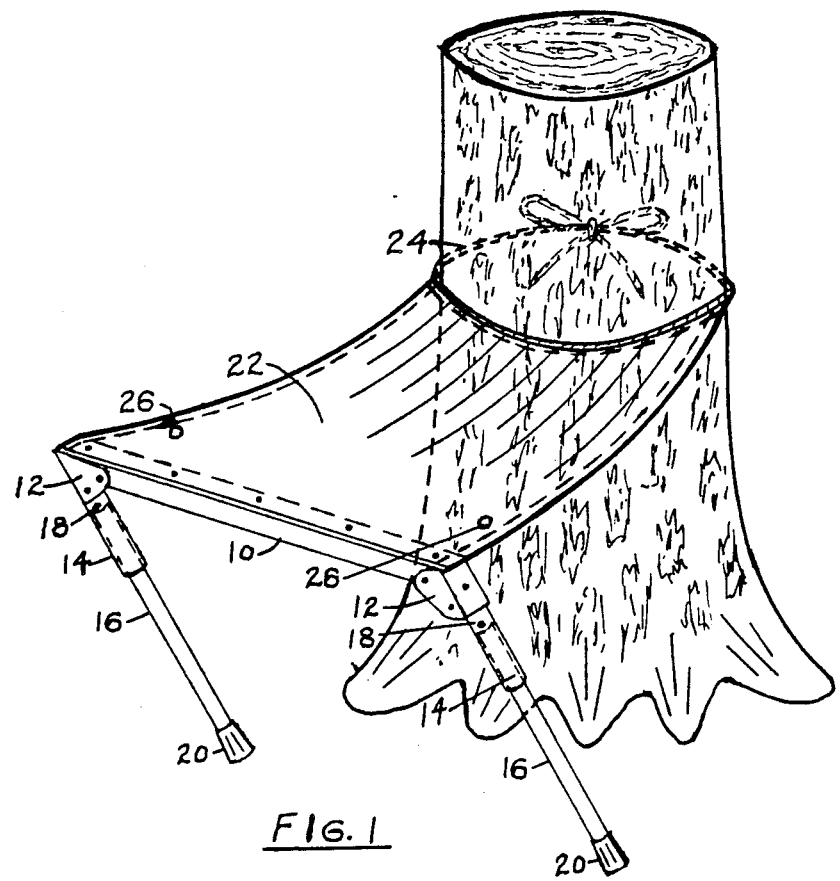
FIG. 1 shows the seat assembly in operative position attached to a tree.

FIG. 1 is a view of the seat assembly attached to a tree ready for use. The seat comprises a square, tubular, horizontal member 10 preferably made of aluminum, which has a pivoting bracket 12 connecting an upper leg section 14 to each end of horizontal member 10. Removable leg extensions 16 telescope into upper leg sections 14. A pop rivet stop 18 limits the length of telescoping leg extension. Leg sections 14 and 16 are preferably made of round aluminum tubing with caps 20 on the bottom end. The lightweight fabric 22 preferably nylon has the perimeter edges hemmed, with the reinforced front edge of fabric 22 riveted to horizontal member 10. The rear semi-circular end of the fabric 22 has a cord 24 of sufficient length inserted and sewn into its hem.

OPERATION OF INVENTION

Figure 2:
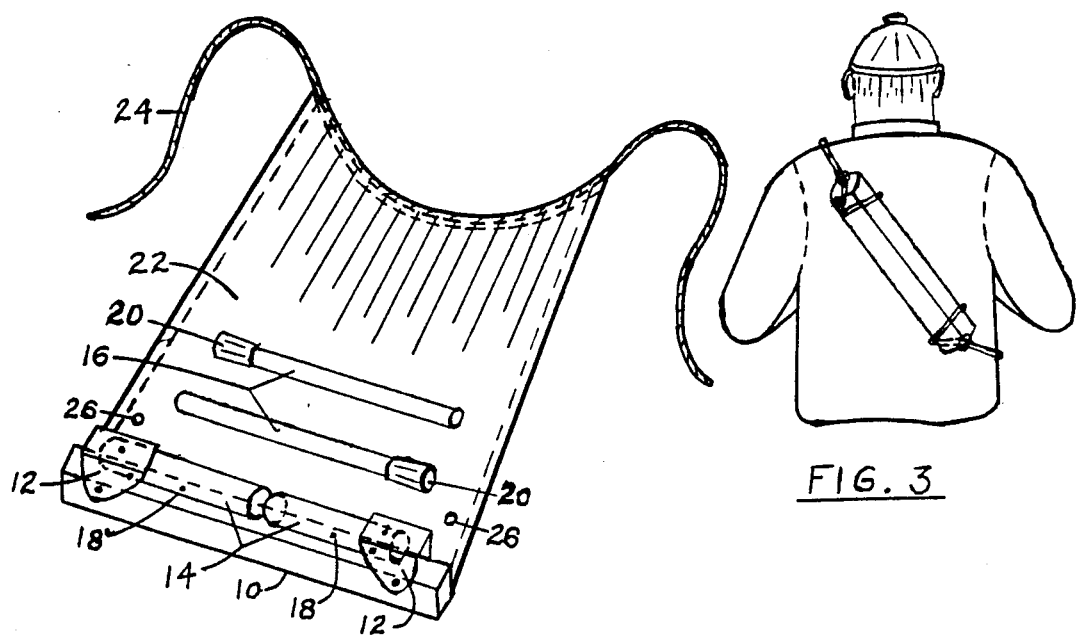
FIG. 2 shows the seat assembly in unfolded condition.
Figure 3:
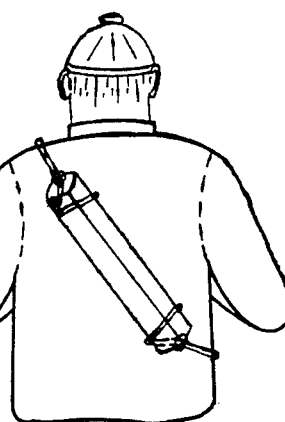
FIG. 3 shows the seat assembly in folded condition carried by a hunter.

Operation is best described by starting with seat set up for use as shown in FIG. 1. User should untie knot from cord 24 to remove seat from tree. Remove lower leg extensions 16 then fold upper leg sections 14 parallel to horizontal member 10 as shown in FIG. 2. Place lower leg extensions 16 on to fabric 22 parallel to horizontal member 10. User then wraps fabric 22 and cord 24 around entire assembly into a compact package as shown in FIG. 3. Each cord end is then slipped through hole 26 in fabric where a half knot is tied to prevent unraveling. User concludes operation by tying the extreme ends of cord 24 into a knot, thus providing a sling for carrying the seat assembly on a hunters back as shown in FIG. 3. The above procedure is reversed for setting the seat up.

CONCLUSION, RAMIFICATIONS AND SCOPE OF INVENTION

Thus the reader will see that the tree seat invention provides a light, compact, highly portable device which is sturdy enough to support individuals of various weights and sizes. For someone above average weight, a cord, not shown in the drawing, may be attached to the lower end of each leg, thus forming a bridge which will prevent the legs from penetrating the ground. Cord attached to the semi-circular end of fabric may have one end considerably longer than the other to allow knot in the sling to be at the hunters back. The type of fabric selected should have the qualities of nylon, with the color resembling color requirements for deer hunters clothing. Other variations are possible, but the above description of the preferred embodiments is aimed at simplicity and usefulness in the overall design.

I claim:

1. A portable lightweight seat, that is attached to a tree, to be used primarily by deer hunters comprising:
   a. a tubular horizontal member, preferably aluminum, with an elongated support leg attached to each end of said horizontal member by a pivotal connection
   b. a sturdy, flexible, lightweight fabric, having one end of said fabric attached to said horizontal member
   c. a flexible cord fastened to semi-circular end of said fabric, whereby seat assembly is attached to a tree.

* * * * *